United States Patent [19]
Milligan

[11] Patent Number: 5,269,548
[45] Date of Patent: Dec. 14, 1993

[54] EXERCISE TRAILER

[76] Inventor: Theresa J. Milligan, 2435 Birch St., White Bear Lake, Minn. 55110

[21] Appl. No.: 916,469

[22] Filed: Jul. 20, 1992

[51] Int. Cl.⁵ .................... A63B 23/04; B62K 27/00
[52] U.S. Cl. .................... 280/204; 280/292; 280/294; 280/304.2; 128/25 R
[58] Field of Search .......... 128/25 R; 280/204, 1.167, 280/239, 292, 304.2, 261, 291, 294, 304.3, 304.5

[56] References Cited

U.S. PATENT DOCUMENTS

| | | | |
|---|---|---|---|
| 2,645,505 | 7/1953 | Durand | 280/292 |
| 3,271,048 | 9/1966 | Beesley et al. | 280/204 |
| 3,443,825 | 5/1969 | Wolf | 280/289 |
| 3,730,174 | 5/1973 | Madison | 128/25 R |
| 3,848,890 | 11/1974 | MacAlpine | 280/204 |
| 3,857,585 | 12/1974 | Foster | 280/294 |
| 3,934,666 | 1/1976 | Ellington | 180/11 |
| 4,351,406 | 9/1982 | Lay | 180/65 R |
| 4,500,104 | 2/1985 | Rudell et al. | 280/1.167 |
| 4,548,423 | 10/1985 | Craven | 280/492 |
| 4,588,199 | 5/1986 | Fisher | 280/204 |
| 4,610,457 | 9/1986 | Harmon | 280/204 |
| 4,638,685 | 1/1987 | Cigolimi | 74/594.6 |
| 4,700,964 | 10/1987 | Hess | 280/289 |
| 4,773,399 | 9/1988 | Richardson | 128/25 R |
| 4,869,494 | 9/1989 | Lambert | 272/23 |
| 5,033,736 | 7/1991 | Hirshfeld | 272/73 |
| 5,067,738 | 11/1991 | O'Connor | 280/204 |
| 5,076,600 | 12/1991 | Fake | 280/204 |

FOREIGN PATENT DOCUMENTS 0906037  12/1945  France .................. 280/204

Primary Examiner—Margaret A. Focarino
Assistant Examiner—Anne Boehler
Attorney, Agent, or Firm—Jacobson & Johnson

[57] ABSTRACT

An exercise trailer for a handicapped person comprising a two-wheel bicycle trailer for towing behind a bicycle with one of the bicycle wheels driving a crank with pedals and stirrups to which the user's feet are attached. The rotation of the bicycle drive wheel as the two-wheel bicycle trailer is towed behind a bicycle rotates the crank to thereby forcibly exercises the person's legs while he or she is riding in the bicycle trailer.

12 Claims, 3 Drawing Sheets

EXERCISE TRAILER

FIELD OF THE INVENTION

This invention relates generally to exercise devices for handicapped persons and, more specifically, to a bicycle trailer for exercising a persons limbs as the bicycle trailer is towed behind a bicycle or the like.

BACKGROUND OF THE INVENTION

This concept of exercise devices for handicapped persons is old in the art. Typically, the exercise devices involve some type of a motorized unit which drives pedals or levers that move the user's legs or arms back and forth. Usually such exercise devices are stationary or require the user to be located in a wheel chair. Since a handicapped person may need to exercise his or her limbs, it would be desirable if the exercise could be enjoyable for the handicapped person. It would also be desirable if the exercise could be done outdoors while at the same time providing exercise for the person assisting the handicapped person.

The present invention provides an improvement to the prior art by providing a towable bicycle trailer or exercise trailer wherein one wheel of the bicycle trailer acts as a drive wheel to propel a crank and foot pedals located on the bicycle trailer. The rider's feet are strapped into the pedals so that the rider's legs are exercised as the bicycle trailer is towed behind a bicycle. The exercise bicycle trailer drive mechanism differs from a conventional bicycle drive in that in a bicycle drive the bicycle wheels are freewheeling so that the person riding the bicycle need not pedal continuously i.e. a person can coast on a bicycle. In contrast in the present invention the bicycle trailer drive wheel is not free wheeling and the drive wheel forcibly rotates a crank arm mounted on the frame. Some of the advantages of the invention are that the person need not be able to balance, nor is the person restricted to any particular location, but can pulled about outside. Additionally, if a person's exercise period is sufficient, a disconnect member allows for disengagement of the drive wheel so that the person riding in the bicycle trailer can ride without having his or her legs exercised.

DESCRIPTION OF THE PRIOR ART

U.S. Pat. No. 4,869,494 shows an exercise apparatus for the handicapped which attaches to a wheel chair to enable a user to exercise his or her legs while also providing exercise for the muscles in the torso and the body extremities.

U.S. Pat. No. 3,44325 shows a two-wheel bicycle with a shift mechanism for shifting between the different gears on the bicycle.

U.S. Pat. No. 4,700,964 shows a bicycle for use in performing free-style tricks with the handles and the pedals of the bicycle including rotatable ball bearings.

U.S. Pat. No. 4,638,685 shows an orthopedic safety strap suitable to keep a cyclist's feet on the respective bicycle pedals.

U.S. Pat. No. 4,351,406 shows a velocipede for the physically handicapped with foot pedals which exercise the user's leg as the velocipede is moved along the ground. The invention also includes a means to prevent movement of the legs should the user's legs become impeded in the mechanism.

U.S. Pat. No. 5,033,736 shows a passive exercise bicycle with a motor which drives the pedals to exercise the feet of a person seated in a wheelchair.

U.S. Pat. No. 5,067,738 shows a child-powered one-wheeled bicycle trailer with a free-wheeling bicycle drive on the bicycle trailer that allows a child to help propel the trailer and the towing bicycle. A derailer allows the child to change gear ratios on the one-wheeled trailer. A pivotal connection holds the frame to the seat post.

U.S. Pat. No. 4,773,399 shows a device for exercising the arms and legs of a person who has difficulty moving his or her limbs. The crank arms and pedals are driven by a motor, while the person sits in a wheel chair.

U.S. Pat. No. 3,934,666 shows a bike booster comprising a trailer with a gasoline engine located on the trailer to assist the bicycle rider.

U.S. Pat. No. 3,848,890 shows a coupling for connecting a trailer to a bicycle in which the coupling is flexible and pivotable in two planes to allow rotation of the connector as the bicycle and the trailer are moved about.

U.S. Pat. No. 4,610,457 shows a swivel-hitch for connecting a trailer to a vehicle such as a motorcycle or a land rover. The hitch includes ball bearings which are rotatable 360 degrees to provide unlimited rotational movement between the vehicle and the trailer.

U.S. Pat. No. 4,588,199 shows a swivel connection for a trailer for a motorcycle. The swivel is located in the tongue of the trailer to prevent torque transference to the rear of the motorcycle.

U.S. Pat. No. 4,548,423 shows a universal trailer hitch for mounting a trailer to a towing vehicle. U.S. Pat. No. 5,076,600 shows a one-wheel bicycle trailer with an enclosed compartment for a child to ride in.

BRIEF SUMMARY OF THE INVENTION

Briefly, the invention comprises a two-wheel bicycle trailer for towing behind a bicycle with one of the wheels driving a crank with pedals to which the user's feet are attached. The rotation of the bicycle drive wheel as two-wheel bicycle trailer is towed behind a bicycle rotates the crank and pedals thereby exercises the person's legs while he or she is riding in the trailer.

DESCRIPTION OF THE PREFERRED EMBODIMENT

Figure 1:
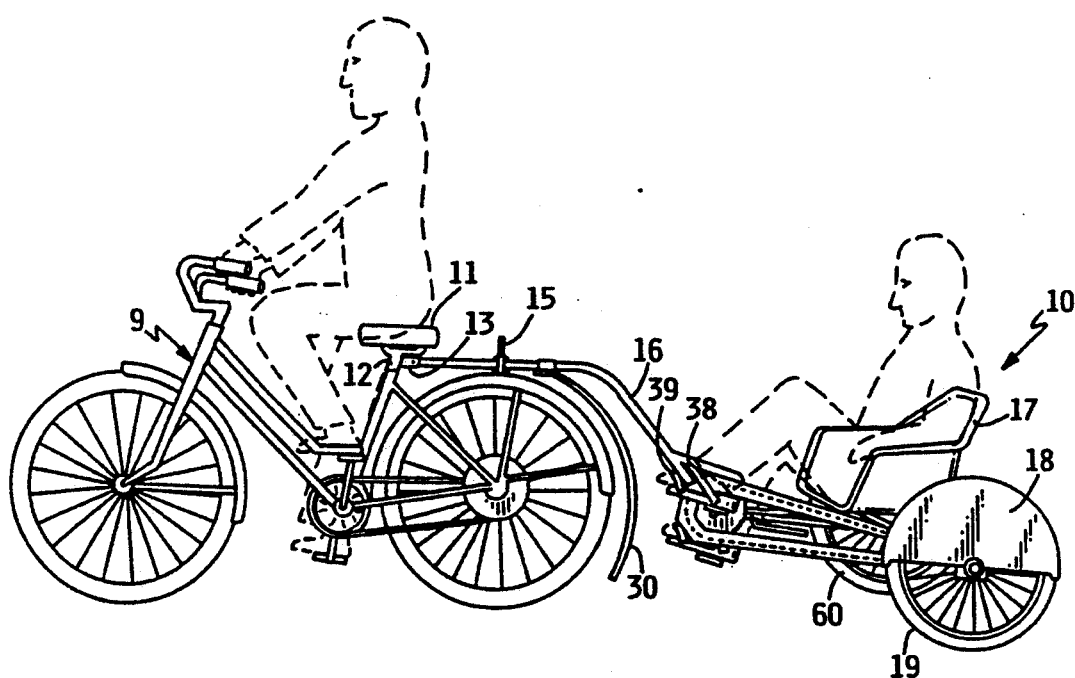
FIG. 1 is a perspective view of a bicycle rider towing the exercise trailer of the present invention.

FIG. 1, reference numeral 10, generally identifies the exercise trailer of the present invention. Reference numeral 9 generally identifies a bicycle for pulling exercise trailer 10. A person is outlined in phantom pedaling bicycle 9. Similarly, a person receiving exercise is outlined in phantom on exercise trailer 10. Exercise trailer comprises a frame 16, which has one end of the frame connected to seat post 12 through a swivel attachment 13. The other end of frame 16 is supported by bicycle wheels 19 and 60.

Figure 2:
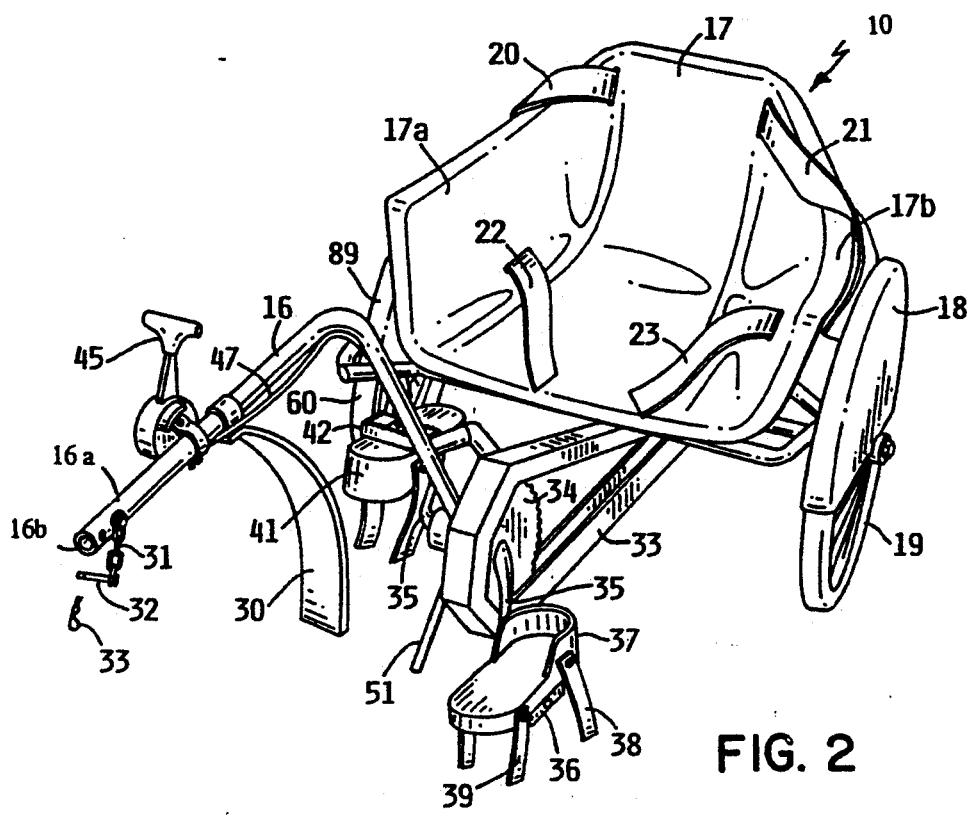
FIG. 2 shows a perspective view of the exercise trailer.

Referring to FIG. 1 and FIG. 2, in general the invention comprises an exercise vehicle for a handicapped person having a frame 16 having a seat 17 mounted on frame 16 to support a handicapped person therein. A pair of wheels 19 and 60 support the frame in an upright position without the handicapped person having to balance the exercise vehicle. At least one of the wheels is a drive wheel, with the drive wheel connected to a crank arm 35 that is rotatably mounted on the frame through a pair of sprockets and a drive chain. A pivotal hitch connects frame 16 to the bicycle for towing the exercise trailer so that when the exercise trailer is towed the drive wheel rotates the drive chain to thereby rotate the crank arm to forcibly exercise the limbs of a person riding in the seat of the exercise vehicle. The exercise trailer also contains means for disengaging the drive wheel so that the crank arm does not rotate the pedals as the drive wheel rotates to enable the exercise vehicle to be disabled and pulled as a conventional bicycle trailer.

In order to exercise a person riding an exercise trailer 10 an operator sits on the seat 11 of the bicycle 9 and pedals the bicycle to pull exercise trailer 10. Located immediately behind seat 11 is a drive wheel disengaging lever 15 attached to frame 16 behind drive wheel disengaging lever 15 is a fender 30 to prevent the bicycle wheel from throwing rocks and dirt rearward onto the person riding in exercise trailer 10. FIG. 2 shows exercise trailer 10 with a drive wheel 19 on one side and a similar but non driving wheel 60 on the opposite side of. A skirt 18 shrouds the top portion of the wheel 19 to prevent a person from catching his or her fingers in the spokes of wheel 19. Similarly, A skirt 89 shrouds the top portion of the wheel 60 to prevent a person from catching his or her fingers in the spokes of wheel 60.

FIG. 2 shows exercise trailer 10 includes a butterfly like seat 17 having a first side extension 17a and a second side extension 17b to prevent the person from sliding sideways out of the exercise trailer. In addition, if needed, the exercise trailer includes a strap 20 and a strap 21 having a Velcro member (not shown) to strap around the person torso to hold the person torso upright in the exercise trailer. Similarly, a lower lap strap 22 and another lower lap strap 23 are located at the bottom of seat 17 to fit around the lap of the user and help keep the user sitting upright during exercise. A fold up kick stand 51 allows the exercise trailer to sit upright when not connected to a bicycle.

Exercise trailer 10 includes a double crank arm 35 with a sprocket 34 powered by a drive chain which connects to a drive sprocket 73 (FIG. 5) underneath exercise trailer 10. A chain guard 33 extends around drive chain 50 (FIG. 3) to prevent the person riding the exercise trailer from getting clothes or fingers caught in drive chain 50. Located in one end of the drive crank 35 is a first foot holder or stirrup 37 which is attached to pedal 36 and on the other end of drive crank 35 is a second foot holder or stirrup 37 attached to pedal 42. The straps on the foot holders fit around the user's shoe to hold the foot in position to obtain the exercise benefit. That is, a first strap 39 fits around the front of the user's foot and a rear strap 38 fits around the back portion of the user's foot. An identical foot holder 41 sits on the opposite pedal 42 so that a user's feet can be strapped in as shown in FIG. 1.

Located in the front of frame 16 is a quick disconnect member comprising a tube 16a having a pin 32 for extending through an opening 16b in frame member 16 for engaging a male member 13 attached to seat post 12. In the preferred embodiment male member 13 is a swivel hitch that will not tip the trailer if the bicycle falls over. A cotter pin 33 extends through pin 32 to hold pin 32 in place.

Figure 3:
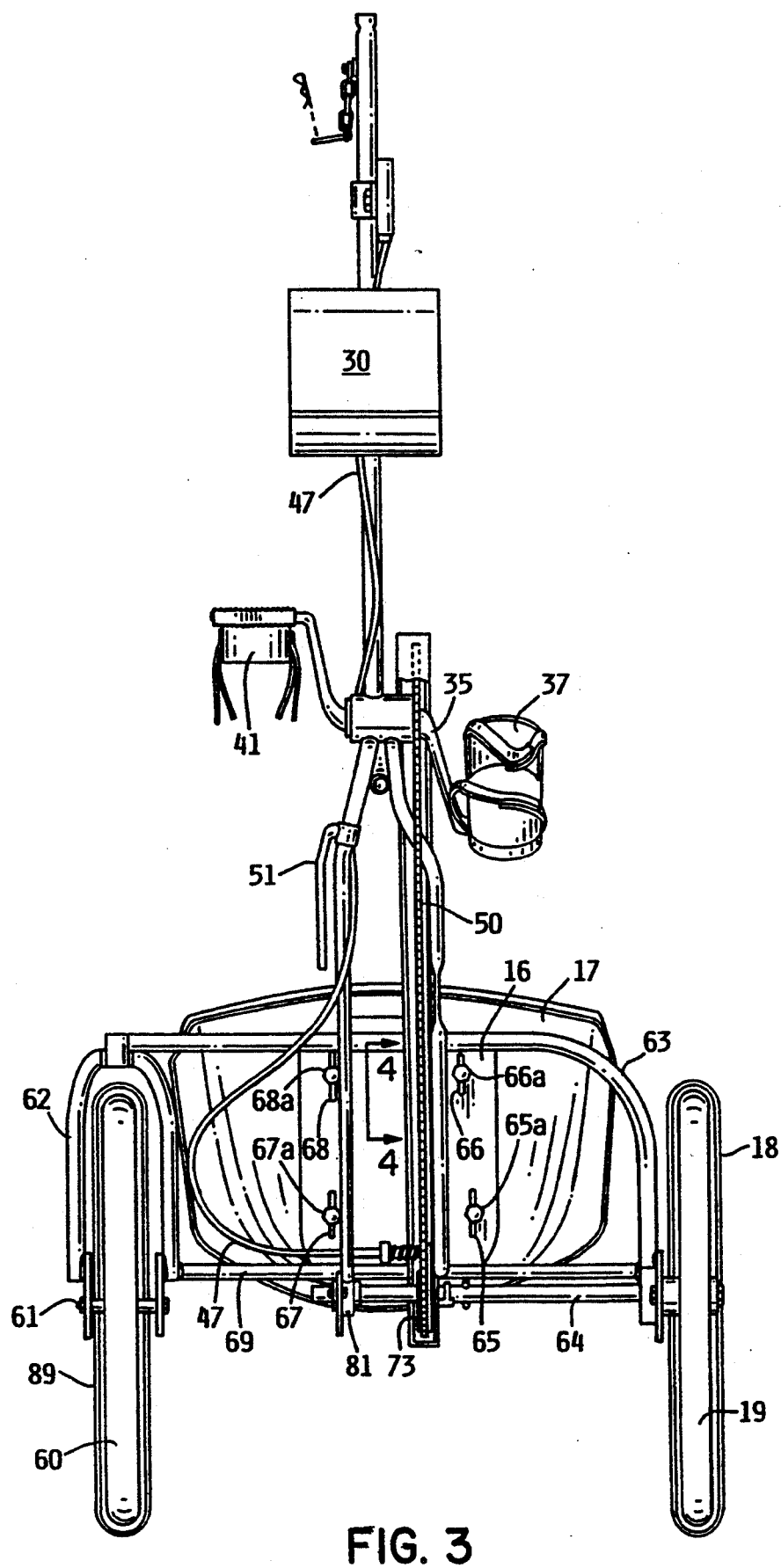
FIG. 3 shows a bottom view of the exercise trailer.

FIG. 3 shows the underside of exercise trailer 10, having non drive wheel 60 rotatably supported on axle 61 which connects to a yoke 62 which connects to frame 63. Located on the opposite side of exercise trailer is drive wheel 19. Drive wheel 19 mounts on a rotatable drive shaft 64 that is freely journaled in the housing 81 and also in the end of frame 63. Drive wheel 19 can be engaged with or disengaged with drive sprocket 73.

Seat 17 is secured to frame 16 by stud bolts 65a, 66a, 67a and 68a which fit respectively into slots 65, 66, 67 and 68 in frame 16. The purpose of having elongated slots in the frame is to allow one to slide seat 17 forward or backward to adjust for the height of the user riding exercise trailer 10. That is to move seat 17 forward one loosens bolts 65a, 66a, 67a and 68a and slides seat 17 forward or backward and then tightens the bolts to secure the seat in place.

Figure 4:
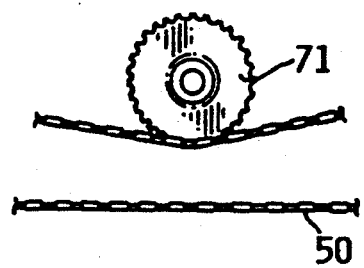
FIG. 4 shows an idler sprocket taken along lines 4—4 of FIG. 3.
Figure 5:
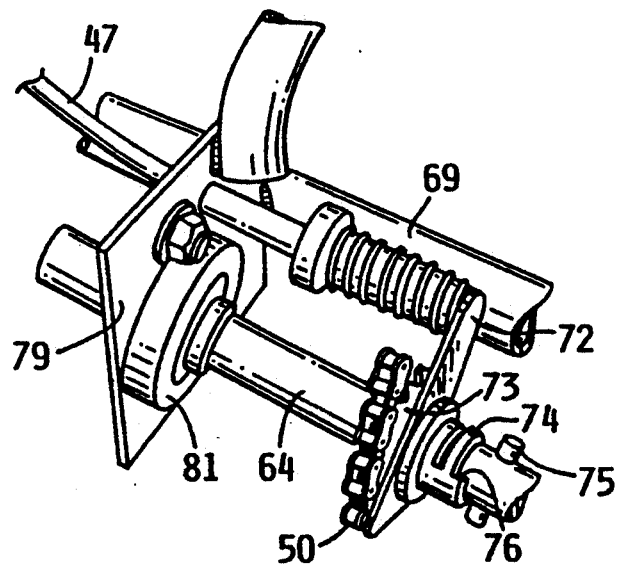
FIG. 5 shows a partial view of the drive wheel disengagement member.

FIG. 4 shows an idler sprocket 71 and a portion of drive chain 50 which drives crank 35 from drive wheel 19. FIG. 5 shows a partial sectional view of engage and disengage member 47 for engaging drive wheel 10. Housing 81 generally rotationally supports drive shaft 64 which connects to drive wheel 19 (FIG. 3). Chain 50 engages a sprocket wheel 73 which is adjacent to plate 72 whose axial position along axle 64 is controlled through member 47 and a spring 69.

Drive shaft 64 includes a cylindrical pin 75 extending therethrough for engagement with a collar 74 having a lip 76 extending therefrom to engage and disengage pin 75. That is, if the operator of the bicycle wants to engage the drive wheel 19 to begin the exercising for the person on the trailer 10 the person on the bicycle pushes shift lever 15 which forces collar 74 toward the right in the drawing so drive pin 75 engages lip 76. In this position, drive wheel 19 (FIG. 3) rotates sprocket 73 which drives chain 50 which in turn rotates crank 35 and thereby exercises the user's legs. It should be pointed out that, in the present application, the drive wheel 19 propels the crank and that the crank does not propel the drive wheel. That is, the moment the exercise trailer moves forward while a person is seated therein, the drive wheel starts the crank 73 rotating, thereby beginning to exercise the user's legs.

If needed a canopy can be attached to seat 17 to protect the person in the exercise trailer from sun or rain.

I claim:

1. An exercise vehicle for a handicapped person comprising:
   a frame;
   a seat mounted on said frame to support a handicapped person therein;
   a pair of wheels for supporting said frame in an upright position without the handicapped person having to balance the exercise vehicle with at least one of said wheels a drive wheel, said drive wheel connected to a first drive sprocket;
   a crank arm rotatably mounted on said frame, said crank arm having a second sprocket;
   a drive chain connecting said first drive sprocket to said second sprocket so that when said exercise vehicle is pulled the drive wheel rotates said crank arm to exercise the handicapped person;

a hitch connected to said frame for towing said exercise vehicle so that when said exercise vehicle is towed said drive wheel rotates the drive chain to thereby rotate the crank arm to forcibly exercise the limbs of a person riding in said seat of said exercise vehicle; and lever means accessible from a bicycle towing said exercise vehicle to enable a bicycle rider to disengage said drive wheel so that the crank arm does not rotate as the drive wheel rotates to enable the exercise vehicle to be pulled as a trailer.

2. The exercise vehicle of claim 1 wherein said seat comprises a bucket seat including seatbelts to prevent a person from falling out of said bucket seat.

3. The exercise vehicle of claim 1 including a chain guard over said drive chain to prevent the user from catching his or her extremities in the chain.

4. The exercise vehicle of claim 1 including a fender over said wheels to prevent the user's extremities from getting caught in said wheels.

5. The exercise vehicle of claim 1 wherein said crank arm includes foot pedals with foot straps to hold a user's feet therein during exercising.

6. The exercise vehicle of claim 1 wherein said hitch comprises a swivel hitch for attaching said exercise vehicle to the seat post of a bicycle.

7. The exercise vehicle of claim 1 including a splashguard mounted to said frame to prevent objects from the bicycle wheel from impinging upon the rider in the bicycle trailer.

8. The exercise vehicle of claim 1 including a kickstand to hold the exercise vehicle in an upright position when disconnected from the bicycle.

9. The exercise vehicle of claim 1 including means to position the bucket seat in relationship to said crank to permit use of the exercise vehicle as the user grows.

10. The exercise vehicle of claim 1 including a seatbelt to hold a person in said exercise vehicle.

11. The exercise vehicle of claim 1 including a canopy extending over said exercise vehicle to keep the sun away from the person.

12. An exercise bicycle trailer for a handicapped person comprising:

a frame;

a seat mounted on said frame to support a physically or mentally handicapped person therein;

a pair of wheels for supporting said frame in an upright position without the handicapped person having to balance the trailer with at least one of said wheels a drive wheel, said drive wheel connected to a first drive member;

an exercising member mounted on said frame;

means connecting said drive wheel to said exercising member;

a hitch connected to said frame for towing said exercise vehicle so that when said drive wheel rotates, the drive wheel rotates the exercising member to exercise the limbs of a person riding said exercise bicycle vehicle; and means proximate the hitch for manually disengaging said drive wheel so that the drive wheel does not rotate the exercising member to enable a person to ride in the trailer without exercising.

* * * * *